(12) United States Patent
Bayona P. et al.

(10) Patent No.: US 9,694,564 B2
(45) Date of Patent: Jul. 4, 2017

(54) PEELABLE PUNCTURE-RESISTANT FILM FOR PACKAGING

(71) Applicant: Inteplast Group, Ltd., Livingston, NJ (US)

(72) Inventors: Rafael E. Bayona P., Morristown, TN (US); Paul T. Alder, Lanoarie (CA); Gregory G. Gillis, Morristown, TN (US)

(73) Assignee: Inteplast Group Corporation, Livingston, NJ (US)

( * ) Notice: Subject to any disclaimer, the term of this patent is extended or adjusted under 35 U.S.C. 154(b) by 212 days.

(21) Appl. No.: 14/727,254

(22) Filed: Jun. 1, 2015

(65) Prior Publication Data
US 2015/0343751 A1    Dec. 3, 2015

Related U.S. Application Data

(60) Provisional application No. 62/005,947, filed on May 30, 2014.

(51) Int. Cl.
  *C08F 210/00*    (2006.01)
  *C08F 10/00*    (2006.01)
  (Continued)

(52) U.S. Cl.
  CPC ............. *B32B 27/32* (2013.01); *B32B 27/08* (2013.01); *B32B 2270/00* (2013.01); *B32B 2307/31* (2013.01); *B32B 2307/51* (2013.01); *B32B 2307/518* (2013.01); *B32B 2307/5825* (2013.01); *B32B 2307/7244* (2013.01); *B32B 2307/7246* (2013.01); *B32B 2439/70* (2013.01);
  (Continued)

(58) Field of Classification Search
  CPC ..... B32B 27/32; B32B 27/08; B32B 2439/70; B32B 2270/00; B32B 2307/5825; B32B 2307/31; B32B 2307/518; B32B 2307/7244; B32B 2307/7246; B32B 2307/51; Y10T 428/2826; Y10T 428/265; Y10T 428/266
  USPC .................... 229/117.27; 428/336, 337, 349; 526/348, 348.1
  See application file for complete search history.

(56) References Cited

U.S. PATENT DOCUMENTS

5,527,608 A * 6/1996 Kemp-Patchett ....... B32B 27/32 427/569
6,525,157 B2   2/2003 Cozewith et al.
(Continued)

OTHER PUBLICATIONS

DOW®, Dow Polymer Versify 2400, Blown Film Flexible Packaging, 2 pages, Published Feb. 2007.
(Continued)

*Primary Examiner* — William Cheung
(74) *Attorney, Agent, or Firm* — Senniger Powers LLP

(57) ABSTRACT

A heat-sealable polymer-based multilayer film for peelable packaging comprising a polymer-based core layer having an interior-facing side and an exterior-facing side; a peelable intermediate layer on the interior-facing side of the core layer, the peelable layer having an interior-facing side and a core-facing side, and the peelable layer containing a peeling agent; and an interior skin layer on the interior-facing side of the peelable layer; wherein the core layer is polypropylene-based and contains a propylene-ethylene copolymer to impart puncture-resistance to the multilayer film.

20 Claims, 1 Drawing Sheet

A - Skin/surface layer

B - Intermediate layer

C - Core layer

D - Intermediate layer

E - Skin / surface layer

(51) Int. Cl.
 *B65D 3/00* (2006.01)
 *G11B 5/64* (2006.01)
 *C09J 7/02* (2006.01)
 *B32B 7/12* (2006.01)
 *B32B 27/32* (2006.01)
 *B32B 27/08* (2006.01)

(52) U.S. Cl.
 CPC ........ *Y10T 428/265* (2015.01); *Y10T 428/266* (2015.01); *Y10T 428/2826* (2015.01)

(56) References Cited

U.S. PATENT DOCUMENTS

| | | | |
|---|---|---|---|
| 6,960,635 | B2 | 11/2005 | Stevens et al. |
| 8,129,015 | B2 | 3/2012 | Humphrey, Jr. et al. |
| 2009/0087648 | A1* | 4/2009 | Lee .................. B32B 27/08 428/336 |

OTHER PUBLICATIONS

DOW®, Peter Heydasch, Novel High Performance Polymers, Dow Europe GmH, 21 pages, Apr. 23-25, 2007.

The Dow Chemical Company, DOW® Fact Sheet—Versify™ Plastomers and Elastomers, 2 pages, Published Jul. 2013, © 2013.
The Dow Chemical Company, DOW® Product Safety Assessment, Versify™ Plastomers and Elastomers,, pp. 1-6, Revised: May 14, 2012.
Elsevier Ltd., Polymer 53 (2012) 3636-3641, Polymer, journal homepage: www.elsevier.com/locate/polymer; Blends of polyolefin/PMMA for improved scratch resistance, adhesion and compatibility, Jie Song et al., 6 pages, © 2012.
Gahleitner, Markus and Severn, John R., Designing Polymer Properties, 42 pages, Copyright © 2008 Wiley-VCH Verlag GmbH & Co. KGaA, Weinheim, ISBN: 978-3-527-31782-0.
Fratini, Christopher M., Study of the Morphology and Optical Properties of Propylene/Ethylene Copolymer Films, 214 pages, Apr. 14, 2006, Blacksburg, Virginia, Copyright © 2006.
Uan-Zo-Li, Julie Tammy; Morphology, Crystallization and Melting Behavior of Propylene-Ethylene Statistical Copolymers, 145 pages, Sep. 2005, Blacksburg, Virginia, Copyright © 2005.
The Dow Chemical Company, DOW®, Versify™ Plastomers and Elastomers, Specialty Propylene-Ethylene Copolymers product sheet, 3 pages, Published Mar. 2007, © 2007.
Elsevier Ltd., Progress in Polymer Science 33 (2008) 797-819, Progress in Polym Science, journal homepage: www.elsevier.com/locate/ppolysci; Olefin polymer technolgies—History and recent progress at The Dow Chemical Company, 24 pages, © 2008.

* cited by examiner

A - Skin/surface layer
B - Intermediate layer

C - Core layer

D - Intermediate layer
E - Skin / surface layer

PEELABLE PUNCTURE-RESISTANT FILM FOR PACKAGING

REFERENCE TO RELATED APPLICATION

This application is a non-provisional application claiming priority to provisional U.S. application Ser. No. 62/005,947, filed May 30, 2014, the entire disclosure of which is expressly incorporated herein by reference.

FIELD OF THE INVENTION

The present invention generally relates to peelable packaging films for packaging.

BACKGROUND OF THE INVENTION

Plastic films used for packaging items under conditions that subject the film to puncture hazards have heretofore been polyethylene films because polyethylene has good puncture resistance, resistance to puncture propagation, tear resistance, and sealability. As an example, packaging for crackers must be puncture resistant because there is a risk of tear from sharp cracker edges as the crackers are filled into the packaging, as well as during shipment and storage either from cracker edges or from a cardboard box in which a plastic bag of crackers is placed.

SUMMARY OF THE INVENTION

Briefly, therefore, the invention is directed to a heat-sealable polymer-based multilayer film for peelable packaging comprising a polymer-based core layer having an interior-facing side and an exterior-facing side; a peelable intermediate layer on the interior-facing side of the core layer, the peelable layer having an interior-facing side and a core-facing side, and the peelable layer containing a peeling agent; and an interior skin layer on the interior-facing side of the peelable layer; wherein the core layer is polypropylene-based and contains a propylene-ethylene copolymer to impart puncture-resistance to the multilayer film.

Other objects and features will be in part apparent and in part pointed out hereinafter.

BRIEF DESCRIPTION OF THE FIGURE

The FIGURE is a schematic representation of an embodiment of a multilayer packaging film of the invention.

DESCRIPTION OF THE EMBODIMENT(S) OF THE INVENTION

The present invention is directed to a heat-sealable, preferably biaxially-oriented polypropylene (BOPP), multilayer film for peelably packaging items where there is a risk of film puncture. In one embodiment, the invention is packaging for crackers. In another embodiment the invention is the film itself for making such packaging.

BOPP refers to the fact that the film is oriented in two directions, the machine direction and the transverse direction. That is, after extrusion, the film is stretched in both the machine direction and the transverse direction.

In one embodiment the packaging film of the invention has five layers as depicted schematically in The FIGURE where layer C is the core layer that is the primary provider of the bulk and strength for the film. Layers B and D are adjacent the core layer and are intermediate layers that impart peelability and optionally other properties such as oxygen-barrier properties. Layers A and E are the skin layers that impart sealing properties and, optionally, printability.

The polymer-based core layer C has an interior-facing side and an exterior-facing side. The peelable intermediate layer B is on the interior-facing side of the core layer. Layer B has interior-facing side and a core-facing side, and contains a peeling agent. Layer A is an interior skin layer on the interior-facing side of the peelable layer.

The core layer is a polymer-based layer which comprises at least about 50 wt % polymer, such as at least about 75 wt % of a polymer. In one embodiment, the core layer has at least about 75 or 80 wt % of a homopolymer of polypropylene. In one such embodiment this homopolymer is homopolymer polypropylene having a melt flow index (MFI) between 1.2 to 3.0 g/10 minutes, preferably 1.6 to 2.4 g/10 min.

The present invention involves incorporating an additive into the core layer composition which enhances puncture resistance. In one embodiment, at least about 8 wt % such as between about 8 and about 25 wt %, such as between about 10 and 20 wt % of an elastomer is added to the core layer composition to enhance puncture resistance. The elastomer is a propylene-ethylene copolymer which is compatible with polypropylene and which is also elastic so as to improve puncture resistance. Some elastomers, such as Affinity, EXACT, and the like are based on ethylene with C4, C6 and C8 copolymers and are not compatible with PP and may have a negative effect on puncture impact. In the preferred embodiments, the core layer composition is free of elastomers which are incompatible with PP. For example, the core layer composition is preferably free of elastomers based on ethylene with C4, C6 and C8 copolymers.

In one preferred embodiment, the elastomer is based on propylene, such as a propylene and ethylene copolymer with propylene as the major (>50 wt %) component. For example, the elastomer in one embodiment is a propylene and ethylene copolymer having at least about 70 or 80 wt % propylene, such as between about 80 and 90 wt % propylene, with the balance being ethylene. The copolymer in one preferred embodiment has a density of 0.7 to 1.0 g/cm$^3$, in another embodiment of 0.75 to 0.95 g/cm$^3$, in yet another embodiment of 0.8 to 0.9 g/cm$^3$, and in still yet another embodiment of 0.85 g/cm$^3$. The copolymer may have a melt flow rate of 1 to 30 dg/min, in another embodiment of 2 to 25 dg/min, in yet another embodiment of 2 to 15 dg/min, in still yet another embodiment of 2 to 10 dg/min, in still yet another further embodiment of 2 to 5 dg/min, and in still yet even another further embodiment of 2 dg/min. The copolymer may have a total crystallinity of 1% to 20%, in another embodiment of 5% to 10%, in yet another embodiment of 6% to 8%, and in still yet another embodiment of 7%. An example of a suitable elastomer is available under the trade designation Dow Versify 2400.

Other elastomers of propylene copolymers (compatible with PP) having elasticity are appropriate as puncture resistance additives. The elastomer should exhibit a high level of attacticity (syndiotacticity or heterotacticity) consistent with low crystallinity, increased elongation, and low mass density. The elastomer may be thermoset or thermoplastic.

Other additives may be included in the core layer in amounts up to, for example, 10 wt %. An antistatic agent such as an amine may be optionally included. For example, there may be between about 50 and about 500 ppm of an amine as an antistatic agent, such as about 150 ppm. A slip agent may also be included. A slip additive is a plastics modifier that acts as a lubricant by exuding to the surface of the plastic during and immediately after processing to reduce friction between layers of film. Lower friction facilitates handling of the film and other surfaces, e.g., rollers, to which the film comes into contact. Slip additives are generally fatty materials, such as, for example, long chain fatty acids, alcohols, and amides. Preferred slip additives are fatty amides having carbon chains generally ranging from 14 to 22 carbon atoms, such as from 15 to 19 carbon atoms, including oleamide and stearic amide. For example, the core layer may include between about 150 and 500 ppm of an amide as a slip agent, such as about 250 ppm. Accordingly, in one embodiment the core layer comprises more than 83 wt % homopolymer PP, about 15 wt % propylene-ethylene copolymer, and about 2 wt % other additives. In a currently preferred embodiment, the core layer comprises 75 to 90 wt % homopolymer of PP, 8 to 25 wt % of elastomer, and balance of non-polymer additives such as slip agents and anti-static agents; for example, 75 to 90 wt % homopolymer of PP, 8 to 25 wt % of elastomer, and no more than 5 wt % of non-polymer additives such as slip agents and anti-static agents. In an especially preferred embodiment, these are the only components of the core layer composition. For example, in one embodiment, the core layer consists of about 80 to about 85 wt % homopolymer PP, about 10 to 20 wt % propylene-ethylene copolymer elastomer, and no more than 5 wt % other components.

The core layer is much thicker than the other layers and in preferred embodiments occupies at least about 80% of the thickness of the overall multilayer film. In one embodiment, the core layer has a thickness of at least about 25 μm, such as between about 25 and about 100 μm, between about 50 and about 100 μm; or between about 30 and about 60 μm, such as between about 35 and about 50 μm.

The overall thickness of the multilayer film in one embodiment is at least about 35 μm, such as between about 35 and about 100 μm. Various embodiments within this scope have a thickness between about 50 and about 100 μm, such as between about 55 and 65 μm, or between about 65 and 75; or between about 30 and about 60 μm, such as between about 35 and about 50 μm, or between about 40 and 50 μm.

Intermediate layer B depicted in the above example imparts peelability and is, for example, a blend of a propylene polymer and an ethylene polymer. The propylene polymer in one embodiment is a polypropylene homopolymer or a copolymer of propylene and ethylene having a low ethylene content such as not more than 2 wt % or not more than 1 wt %, in polymerized propylene. The propylene polymer preferably has a high isotactic content, such as greater than 95 weight percent. The ethylene polymer is in one embodiment a copolymer of ethylene with at least one alpha-olefin, for example copolymers of ethylene with propylene, butene-1 or 4-methylpentene-1.

The peelable layer comprises a peeling agent, which agents are known in the art. The specific peeling agent selected for use in the films of the invention is not narrowly critical. In one embodiment, the peeling agent is an ethylene copolymer such as, for example, a compound selected from the group consisting of ethylene acrylic acid, ethylene methacrylate, and ethylene ethyl acrylate, and combinations thereof. Suitable peeling agents include ethylene acrylic acid copolymer available from Dow under the family name of Primacor and polypropylene-modified ethylene methacrylate available from DuPont under the family name of Appeel. The concentration of peeling agent in the peelable layer is typically between about 1 and about 80%, such as between about 5 and about 50%. In the currently preferred embodiment, peeling agent concentration is selected to achieve an initial peak peel strength of less than 450 g/inch and a subsequent continuous peel strength of less than 350 g/inch.

The peelable intermediate layer has a thickness of, for example, between about 0.5 and about 6 μm, for example between about 0.75 and about 3 μm.

The peeling agent constitutes, from one perspective, contamination that imparts incompatibility between layers, rendering them peelable. A negative effect of this on films of this nature, however, is a reduction in puncture resistance, puncture propagation resistance, and tear resistance. The inventors have discovered, however, that this effect is tolerable and can in fact be overcome by including an elastomer in the core layer as described above.

The other intermediate layer D is an optional additional functional layer and may be used to impart properties such as water vapor transmission barrier and/or oxygen barrier properties. In one example where this barrier layer is employed, it contains between about 10 wt % and about 70 wt % of a functional component in polypropylene, such as about 30 wt % hydrocarbon resin such as Oppera from Exxon Mobil in 70 wt % polypropylene. In one embodiment, this intermediate functional layer on the exterior-facing side of the core layer contains from about 10 to about 85 wt % hydrocarbon resin, such as between about 15 and 50 wt %. This intermediate functional layer has a thickness of, for example, between about 0.5 and about 6 μm, for example between about 0.75 and about 3 μm.

The skin layers A and E are made from heat-sealable compositions of any of a variety of heat sealable polymers known in the art. Typically, the heat sealable polymer is selected from olefin copolymers, and more particularly from copolymers containing units derived from at least two of ethylene, propylene and butene-1. Particularly preferred heat sealable polymers for the interior skin layer are propylene-ethylene copolymers and/or ethylene-propylene-butene-1 terpolymers and/or propylene-butene-1 copolymers with at least 50 wt % propylene in the copolymers and terpolymers. A currently preferred embodiment of the skin, or seal, layer comprises 75 wt % propylene-butene copolymer (available from Mitsui under the Tafmer brand name), 15 wt % propylene-ethylene copolymer (Versify) to further enhance elasticity, puncture resistance, and sealing, and 10 wt % other common additives.

Another suitable example for the skin layer comprises 2 wt % ethylene, 88 wt % propylene, and 10 wt % butene-1. Another example of a suitable skin layer material is a layer which contains 20%-45% matte resin, 15-25% propylene/ethylene copolymer, 15-25% propylene/butylene copolymer, and 15-35% GMS concentrate and is formulated to impart a low heat seal initiation temperature. The skin layers have a thickness of, for example, between about 0.25 and about 6 μm, for example between about 0.5 and about 3 μm. In a preferred embodiment, the seal initiation temperature is less than 90° C., preferably less than 85° C., such as between 68 and 80° C.

An optional metallized layer may be applied over the skin layer as is well known in field of food packaging.

In one preferred embodiment, the total thickness of the BOPP film is 70 μm, with the thicknesses of A, B, C, D, and E being 2.2, 2, 63.8, 1 and 1 μm, respectively. A is the interior skin layer, B is the peelable intermediate layer, C is the core layer, D is a second intermediate layer, and E is an exterior-facing skin layer.

The multilayer films of the invention have a puncture load at rupture of at least 1.2 kgf when tested by the Brugger method at 0.5 seconds and 300 N. In a preferred embodiment, the puncture load at rupture is at least 2.0 kgf, such as between about 2.0 kgf and 3.5 kgf. The films also have a puncture deflection at maximum load of at least about 7 mm, such as between 7 and 9 mm, or between 7 and 8 mm, or between 7.4 and 8 mm.

Example 1

Films of the invention were prepared and tested in comparison to HDPE films currently used for these types of cracker bag-in-box packaging applications. The films of the invention exhibited greater load and greater deflection prior to puncture in puncture deflection rupture tests conducted by the Brugger method at 300N for 0.5 seconds. The compositions and thickness of multilayer films of the invention are presented in Table 1. Properties of the multilayer films of the invention (X-386, X-387) with varied overall thickness, another (thinner) multilayer film of the invention (X2B45), a commercially available packaging film (current structure), and a three-layer BOPP film (X-322) are presented in Table 2.

TABLE 1

| | X-386 | | X-387 | |
| --- | --- | --- | --- | --- |
| | Thickness, um | Compositions | Thickness, um | Compositions |
| Layer A | 2.2 | 90% C3/C4 + Additives | 2.2 | 15% C3/C2 + 75% C3/C4 + Additives |
| Layer B | 2 | 80% Ho-PP + 20% PA | 2 | 80% Ho-PP + 20% PA |
| Layer C | 63.8 | 83% Ho-PP + 15% PRA + Additives | 63.8 | 83% Ho-PP + 15% PRA + Addtives |
| Layer D | 1 | 100% Ho-PP | 1 | 100% Ho-PP |
| Layer E | 1 | 96% Ho-PP + Additives | 1 | 96% Ho-PP + Additives |

| | X2B45 | |
| --- | --- | --- |
| | Thickness, um | Compositions |
| Layer A | 2-4 | (10%-20%)C3/C2 + (50%-70%)C3/C4 + Additives |
| Layer B | 1-3 | (80%-90%)HoPP + (10%-20%)PA |
| Layer C | 30-38 | (80%-90%)HoPP + (10%-15%)PRA + Additives |
| Layer D | 2-4 | (90%-98%)HoPP + Additives |
| Layer E | 2-4 | (90%-98%)HoPP + Additives |

Where C3/C4 refers to propylene-butene copolymer; C3/C2 refers to propylene-ethylene copolymer; PRA refers to puncture resistance additive (elastomer); Ho-PP refers to homopolymer polypropylene; and PA refers to peeling agent.

TABLE 2

| | Thickness μm | Max Load Kgf | Extension mm | WVTR g/100 in 2/Day | Seal Initiation Temp. (Note) ° C. |
| --- | --- | --- | --- | --- | --- |
| Current structure | 70-75 | 0.75 | 5.81 | 0.1-0.13 | 95 |
| XE322 | 55 | 1.61 | 10.20 | 0.26 | N/A |
| XE386 | 75 | 2.46 | 7.52 | 0.15 | 70 |
| XE387 | 75 | 2.30 | 7.59 | 0.15 | 75 |

TABLE 2-continued

| | Thickness μm | Max Load Kgf | Extension mm | WVTR g/100 in 2/Day | Seal Initiation Temp. (Note) ° C. |
| --- | --- | --- | --- | --- | --- |
| XE387 | 60 | 2.14 | 7.27 | 0.2 | 75 |
| X2B | 45 | 1.99 | 6.17 | 0.26 | 70 |

It can therefore be appreciated that the invention presents a new option for puncture-resistant films and packaging such as for packaging, e.g., crackers including bag-in-box type applications. In comparison to the current polyethylene films such as HDPE or HDPE/nylon films used for these packaging applications, the polypropylene films of the invention have several advantages. Inasmuch as these films are stiffer and stronger, the films can be made thinner without sacrifice in properties. For example, a thicker HDPE film is required for a certain tear resistance than is required with the films of the invention. Flatness can be more easily controlled. There is more flexibility to alter the film's density and appearance. The films have a higher tear initiation point. Elongation is improved in comparison to blown HDPE so the puncture resistance is also greater. And the ultimate tensile strength is better.

Packaging made from these films also helps keep food fresher longer because the water vapor transmission rate (WVTR) is improved. Water vapor transmission rate is the permeability of the film to water vapor and is expressed as the amount of vapor water that pass through the film in 1 day in a 1 $m^2$ or 100 $in^2$ area. ASTM F1249 is the method used to evaluate this property. The method explains the evaluation of the barrier using Mocon-Permatran equipment at special conditions of temperature and relative humidity (38° C./100.4° F. and 90% RH). The units in which WVTR is expressed are g/100 $in^2$/day in imperial units and g/$m^2$/day in metric units. Lower values are better for packaged goods conservation. Also, thicker films of the same composition have lower WVTR. As a general proposition, a WVTR of <0.3 g/100 $in^2$/day is suitable for packaging applications. The multilayer films of the invention have a WVTR of <0.3 g/100 $in^2$/day, preferably <0.2 g/100 $in^2$/day.

The film resists punctures and ruptures during the bag forming and bag filling processes, and during the process of inserting the bag into the box. The film also resists abrasion worn holes during transportation.

The compositions of the layers are described herein as containing various components by weight %. However, those skilled in the art understand that in a layer of the ultimate film, the specific compounds such as the polypropylene and propylene-butene copolymer may not be separately identifiable or even necessarily separately present. Nonetheless, it is conventional in the art to refer to the final composition as containing a given % of the individual components that go into forming the film; so that is done here. From this perspective, the compositions herein are on an equivalent basis.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A heat-sealable polymer-based multilayer film for peelable packaging comprising:
a polymer-based core layer having an interior-facing side and an exterior-facing side;
a peelable intermediate layer on the interior-facing side of the core layer, the peelable intermediate layer having an interior-facing side and a core-facing side, and the peelable layer containing a peeling agent; and
an interior skin layer on the interior-facing side of the peelable layer;
wherein the core layer is polypropylene-based and contains a propylene-ethylene copolymer to impart puncture-resistance to the multilayer film; and
wherein the multilayer film is biaxially oriented.

2. The multilayer film of claim 1 further comprising an exterior skin layer on the exterior-facing side of the core layer.

3. The multilayer film of claim 1 further comprising a functional layer on the exterior-facing side of the core layer and an exterior skin layer on said functional layer.

4. The multilayer film of claim 1 wherein the core layer has a thickness of at least about 50 μm.

5. The multilayer film of claim 1 wherein the core layer has a thickness between about 50 μm and 100 μm.

6. The multilayer film of claim 1 wherein the peelable intermediate layer has a thickness of between about 0.75 and about 3 μm.

7. The multilayer film of claim 1 wherein the interior skin layer has a thickness of between about 0.5 and about 3 μm.

8. The multilayer film of claim 1 wherein the interior skin layer contains a propylene-ethylene copolymer to impart puncture-resistance to the multilayer film.

9. The multilayer film of claim 1 wherein the core layer comprises at least 75 wt % of a homopolymer of polypropylene.

10. The multilayer film of claim 1 having a puncture load at rupture which is greater than about 1.2 kgf.

11. The multilayer film of claim 1 having a seal initiation temperature of less than about 80° C.

12. The multilayer film of claim 1 wherein the core layer comprises 75 to 90 wt % homopolymer of PP and 8 to 25 wt % of elastomer.

13. The multilayer film of claim 1 comprising:
the polymer-based core layer having the interior-facing side and the exterior-facing side;
the peelable intermediate layer on the interior-facing side of the core layer;
the interior skin layer on the interior-facing side of the peelable layer;
a functional intermediate layer on the exterior-facing side of the core layer; and
an exterior skin layer on the functional intermediate layer on the exterior-facing side of the core layer;
wherein the core layer comprises 75 to 90 wt % homopolymer of PP and 8 to 25 wt % of elastomer.

14. The multilayer film of claim 1 comprising:
the polymer-based core layer having the interior-facing side and the exterior-facing side;
the peelable intermediate layer on the interior-facing side of the core layer;
the interior skin layer on the interior-facing side of the peelable layer;
a functional intermediate layer on the exterior-facing side of the core layer; and
an exterior skin layer on the functional intermediate layer on the exterior-facing side of the core layer;
wherein the core layer comprises 75 to 90 wt % homopolymer of PP, 8 to 25 wt % of elastomer, and no more than 5 wt % non-polymer additives.

15. The multilayer film of claim 1 comprising:
the polymer-based core layer having the interior-facing side and the exterior-facing side;
the peelable intermediate layer on the interior-facing side of the core layer;
the interior skin layer on the interior-facing side of the peelable layer;
a functional intermediate layer on the exterior-facing side of the core layer; and
an exterior skin layer on the functional intermediate layer on the exterior-facing side of the core layer;
wherein the core layer consists of 75 to 90 wt % homopolymer of PP, 8 to 25 wt % of elastomer, and up to 5 wt % other components.

16. The multilayer film of claim 1 comprising:
the polymer-based core layer having the interior-facing side and the exterior-facing side;
the peelable intermediate layer on the interior-facing side of the core layer;
the interior skin layer on the interior-facing side of the peelable layer;
a functional intermediate layer on the exterior-facing side of the core layer; and
an exterior skin layer on the functional intermediate layer on the exterior-facing side of the core layer;
wherein the core layer consists of 75 to 90 wt % homopolymer of PP, 8 to 25 wt % of elastomer, and up to 5 wt % non-polymer additives.

17. The multilayer film of claim 1 comprising:
the polymer-based core layer having the interior-facing side and the exterior-facing side;
the peelable intermediate layer on the interior-facing side of the core layer;
the interior skin layer on the interior-facing side of the peelable layer;
a functional intermediate layer on the exterior-facing side of the core layer; and
an exterior skin layer on the functional intermediate layer on the exterior-facing side of the core layer;
wherein the core layer consists of 75 to 90 wt % homopolymer of PP, 8 to 25 wt % of propylene-ethylene copolymer elastomer, and up to 5 wt % other components;
wherein the multilayer film has a seal initiation temperature of less than about 80° C.

18. The multilayer film of claim 1 comprising:
the polymer-based core layer having the interior-facing side and the exterior-facing side, wherein the core layer as a thickness between 25 and 100 μm;
the peelable intermediate layer on the interior-facing side of the core layer wherein the peelable intermediate layer comprises a blend of propylene polymer and ethylene polymer and a peeling agent, wherein the peelable intermediate layer has a thickness between 0.5 and 6 μm;
the interior skin layer on the interior-facing side of the peelable layer, wherein the interior skin layer has a thickness between 0.25 and 6 μm;

a functional intermediate layer on the exterior-facing side of the core layer, wherein the functional intermediate layer on the exterior-facing side of the core layer layer has a thickness between 0.5 and 6 μm; and an exterior skin layer on the functional intermediate layer on the exterior-facing side of the core layer, wherein the exterior skin layer has a thickness between 0.25 and 6 μm;

wherein the core layer consists of 75 to 90 wt % homopolymer of PP, 8 to 25 wt % of propylene-ethylene copolymer elastomer having a melt flow rate of 2 to 10 dg/min and a total crystallinity of 5% to 10%, and up to 5 wt % other components.

19. A package for crackers comprising a cardboard box and a bag within the box wherein the bag comprises the multilayer film of claim 1.

20. The package of claim 19 wherein the multilayer film comprises:

the polymer-based core layer having the interior-facing side and the exterior-facing side;

the peelable intermediate layer on the interior-facing side of the core layer;

the interior skin layer on the interior-facing side of the peelable layer;

a functional intermediate layer on the exterior-facing side of the core layer; and an exterior skin layer on the functional intermediate layer on the exterior-facing side of the core layer;

wherein the core layer consists of 75 to 90 wt % homopolymer of PP, 8 to 25 wt % of propylene-ethylene copolymer elastomer, and up to 5 wt % other components.

* * * * *